(12) United States Patent
Bain et al.

(10) Patent No.: US 7,942,621 B2
(45) Date of Patent: May 17, 2011

(54) CONTAINER LOADING APPARATUS (75) Inventors: John Laurence Bain, Western Australia (AU); Audrey Patricia Bain, legal representative, Western Australia (AU); Kenneth John Eaton, Western Australia (AU)

(73) Assignee: Container Transhandler Pty Ltd (AU)

( * ) Notice: Subject to any disclaimer, the term of this patent is extended or adjusted under 35 U.S.C. 154(b) by 649 days.

(21) Appl. No.: 11/794,078

(22) PCT Filed: Dec. 23, 2005

(86) PCT No.: PCT/AU2005/001952
§ 371 (c)(1),
(2), (4) Date: Jun. 6, 2008

(87) PCT Pub. No.: WO2006/066344
PCT Pub. Date: Jun. 29, 2006

(65) Prior Publication Data
US 2008/0317570 A1 Dec. 25, 2008

(30) Foreign Application Priority Data
Dec. 23, 2004 (AU) ................................ 2004907274

(51) Int. Cl.
*B60P 1/48* (2006.01)
(52) U.S. Cl. .................. 414/498; 414/555; 414/812
(58) Field of Classification Search .................. 414/498, 414/555, 919, 812
See application file for complete search history.

(56) References Cited

U.S. PATENT DOCUMENTS

| | | | |
|---|---|---|---|
| 5,018,932 A | 5/1991 | Croisier | |
| 5,244,339 A * | 9/1993 | Normand | 414/812 |
| 5,662,449 A * | 9/1997 | Krinhop | 414/24.5 |
| 6,669,433 B1 * | 12/2003 | De Kock | 414/498 |

FOREIGN PATENT DOCUMENTS

| | | |
|---|---|---|
| DE | 296 04 947 U1 | 8/1997 |
| FR | 2 442 213 | 6/1980 |
| GB | 2 146 974 A | 5/1985 |
| SU | 1622198 A1 | 1/1991 |
| WO | WO 89/06611 | 7/1989 |

OTHER PUBLICATIONS

Supplementary European Search Report from corresponding EPO Patent Application No. EP 05821640.9, dated Dec. 3, 1997.

* cited by examiner

Primary Examiner — Michael S Lowe
(74) Attorney, Agent, or Firm — Bliss McGlynn, P.C.

(57) ABSTRACT

A container loading apparatus for a truck (10) comprises a first pair of opposed container attachment arms (14) and a second pair of opposed secondary support arms (22), rotatable about horizontal axes from a stowed position in which the container attachment arms (14) and the secondary support arms (22) are disposed substantially beneath a loaded container, the secondary support arms (22) being rotatable relative to the truck (10) by first actuation rams (30) and the container attachment arms (14) rotatable relative to the secondary support arms (22) by second actuation rams (32).

13 Claims, 12 Drawing Sheets

CONTAINER LOADING APPARATUS

FIELD OF THE INVENTION

The present invention relates to an apparatus for loading containers on and off transport vehicles such as trucks.

BACKGROUND TO THE INVENTION

It is known to transport containers such as sea containers atop flat bed tray trucks. Such trucks often include loading and unloading means for such containers, which allow the container to be unloaded to the side of the truck.

It is considered desirable to provide loading apparatus for a truck to enable a container to be loaded from, or unloaded to, the rear of the truck.

Some previous attempts at providing such loading apparatus have now been revealed by searching of patent databases.

U.S. Pat. No. 5,018,932 discloses a loading apparatus which enables a container to be unloaded from the rear of a truck. The arrangement shown in U.S. Pat. No. 5,015,932 is of limited use as it requires substantial tilting of the container. This could lead to damage of goods contained within.

Soviet Union Patent Publication Number SU 1622198 discloses a loading apparatus for a truck having a long arm pivotable about a location on the truck bed. This arrangement is also of limited use as the long arm can not be stowed on the truck in such a way as to not extend substantially beyond or above the truck.

The present invention attempts to provide a means for achieving the loading and unloading of a container to the rear of a truck which overcomes, at least in part, some of the above mentioned problems.

SUMMARY OF THE INVENTION

In accordance with one aspect of the present invention there is provided a container loading apparatus comprising a container attachment means and a secondary support means, characterised in that the container attachment means and the secondary support means are each independently rotatable about respective substantially horizontal axes from a stowed position wherein the container attachment means and the secondary support means are disposed substantially beneath a loaded container, the container loading apparatus further comprising a first actuation means and a second actuation means, wherein the first actuation means, in use, causes the secondary support means to rotate about its horizontal axis and the second actuation means, in use, causes the container attachment means to rotate relative to the secondary support means.

Preferably, the container attachment means and the secondary support means are each rotatable about the same substantially horizontal axis.

BRIEF DESCRIPTION OF THE DRAWINGS

The present invention will now be described, by way of example, with reference to the accompanying drawings, in which.

DESCRIPTION OF PREFERRED EMBODIMENTS

Referring to the Figures, there is shown a truck 10 carrying a substantially rectangular container 12 such as a sea container. The truck 10 incorporates a container loading apparatus comprising a container attachment means and a secondary support means. The container attachment means is comprised of two first elongate arms 14. The elongate arms 14 extend along opposed sides of the truck 10, each having a rear end 16 and a front end 18. The rear ends 16 are located on opposed ends of a horizontal axle 20.

The horizontal axle 20 extends across the truck 10 at the rear thereof. Preferably, the axle 20 consists of two parts having a tongue and groove construction to ensure simultaneous rotation. In the preferred embodiment of the drawings the axle 20 is located beneath, and to the rear of, the container 12.

The front end 18 of each elongate arm 14 extends approximately two thirds of the way along a base of the container 12, measured from the rear end 16. When the elongate arm 14 is pivoted about the axle 20 such that the front end 18 is adjacent the top of the container 12, the front end 18 is located midway along the container 12. This can be seen in FIG. 3.

The secondary support means comprises two second elongate arms 22. The second elongate arms 22 are substantially C-shaped in cross-section, and are located about the first elongate arms 14 when in a stowed position. The second elongate arms 22 extend from a rear end 24 located on the axle 20 to a front end 26 located about one-third along the length of the first elongate arms 14.

The container loading apparatus further comprises first and second actuation means in the form of first and second hydraulic ram pairs 30, 32. Each of the first hydraulic ram pair 30 is pivotally connected to a respective opposed side of the base of the truck 10 at a front location 34 within an arm receiving channel 38. The front location 34 is adjacent the front end 18 of the first elongate arms 14 when in the stowed position. Each first hydraulic ram 30 extends from the front location 34 to a rear location 36 pivotally connected to the front end 26 of an associated second elongate arm 22. The line of action of each first hydraulic ram is above the axle 20. As such, extension of the first hydraulic rams 30 cause the respective second elongate arms 22 to pivot upwardly about the axle 20.

Each of the second hydraulic ram pair 32 is pivoted at one end to an associated first elongate arm 14 and at the other end to the associated second elongate arm 22.

In a preferred embodiment of the present invention, as shown in the drawings, the arm receiving channels 38, each of the first and second arms 14, 22 and each of the first and second hydraulic rams 30, 32 is arranged to move from an inner stowed position directly beneath the container 12 to an outer stowed position outside, but still beneath, the container 12. This lateral movement is accommodated by the axle 20 being extendible within a shroud 40.

Use of the invention will now be described with reference to the drawings, which are to be understood as a sequential series.

Figure 1:
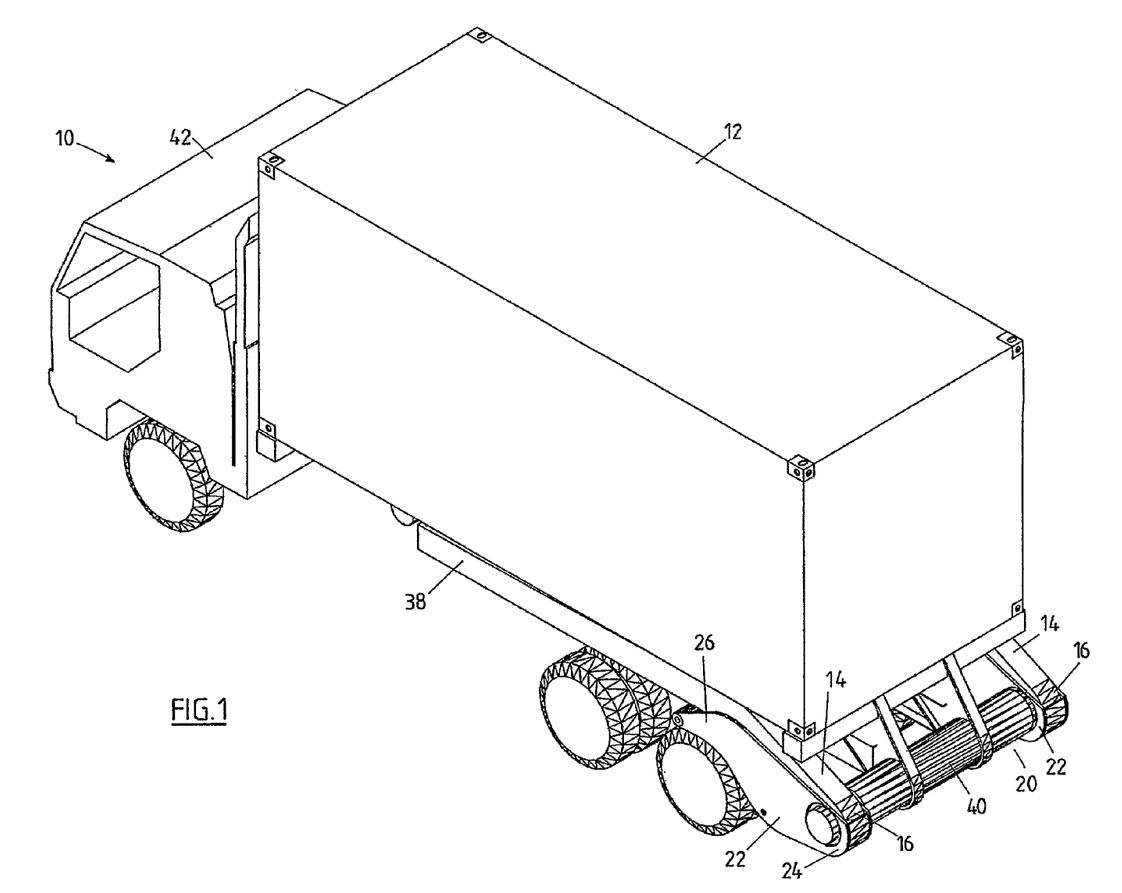
FIG. 1 is a rear, upper view of a truck having a container loading apparatus in accordance with the present invention, the container loading apparatus shown in an inner stowed position.

FIG. 1 shows the container loading apparatus in an inner stowed position. In this position the container 12 is loaded on the truck 10, with each of the first and second arms 14, 22 located within respective arm receiving channels 38. The axle 20 is retracted within the shroud 40. In this way the width of the loaded truck 10 is the wider of a truck cabin 42 or the container 12. Similarly the height of the loaded truck 10 is the higher of the truck cabin 42 or the container 12.

Figure 2:
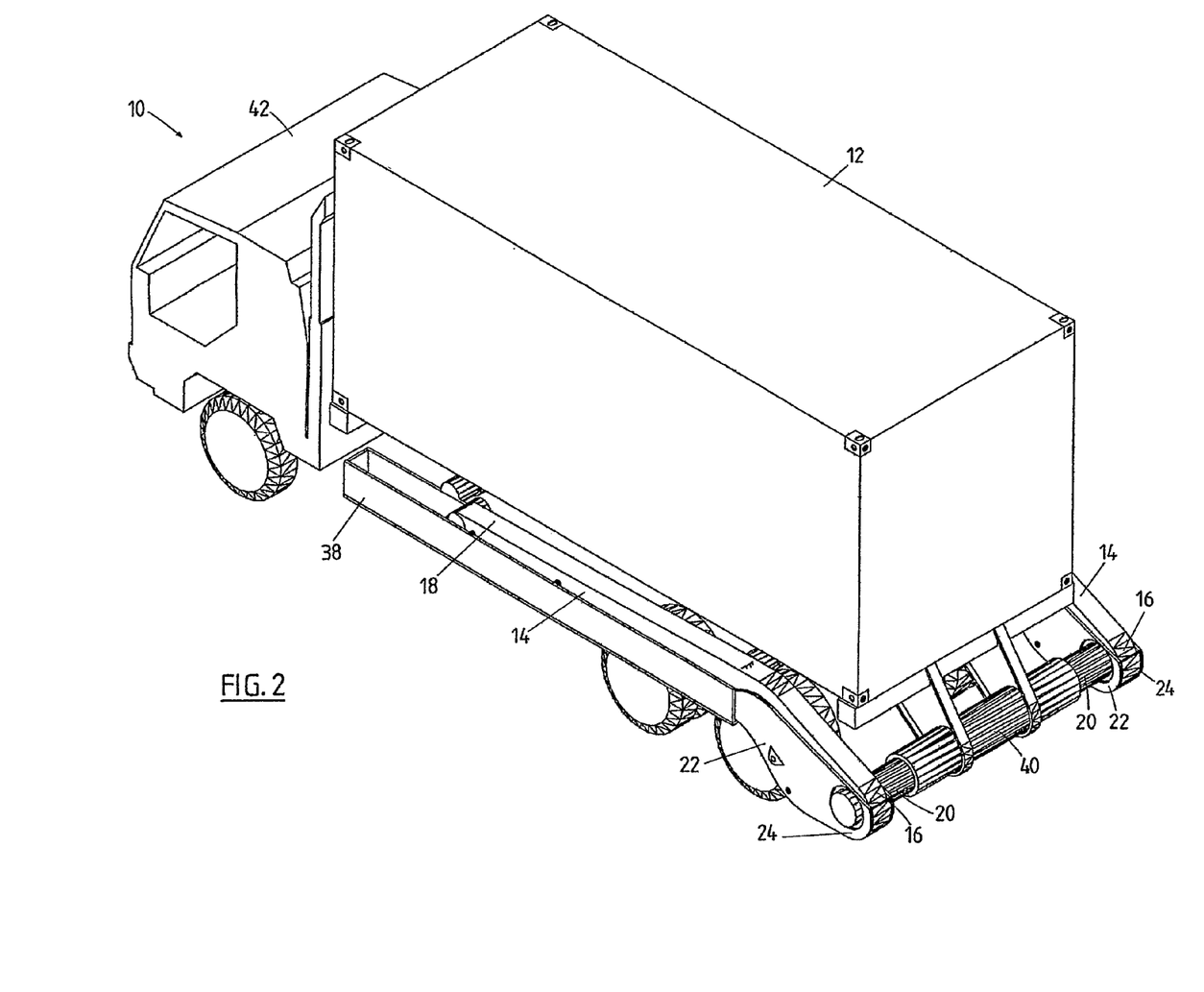
FIG. 2 is a rear, upper view of the truck of FIG. 1, shown with the container loading apparatus in an outer stowed position.

FIG. 2 shows the container loading apparatus in an outer stowed position. In this position the arm receiving channels 38 have extended laterally to the sides of the truck 10, still beneath the container 12, and the axle 20 has extended beyond the shroud 40.

Figure 3:
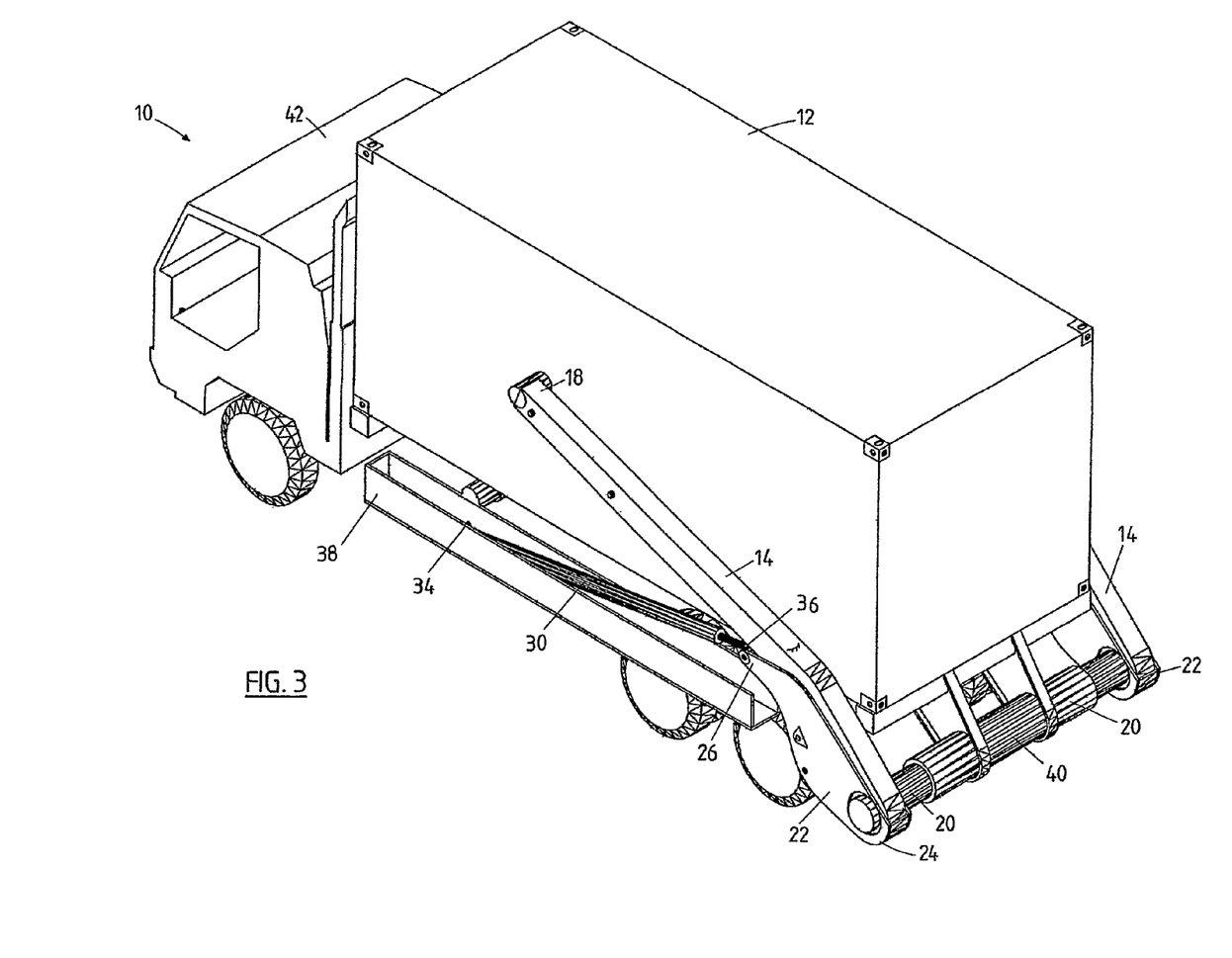
FIG. 3 is a rear, upper view of the truck of FIG. 1, shown with the container loading apparatus in a travelling position during engagement.

FIG. 3 shows the container loading apparatus in a travelling position, in which the first rams 30 have begun to extend, causing the second arms 22 to rotate about a substantially horizontal axis defined by the axle 20. As the second rams 32 remain in a closed configuration, the first arms 14 are constrained to rotate about the substantially horizontal axis defined by the axle 20, being effectively coupled to the second arms 22.

Figure 4:
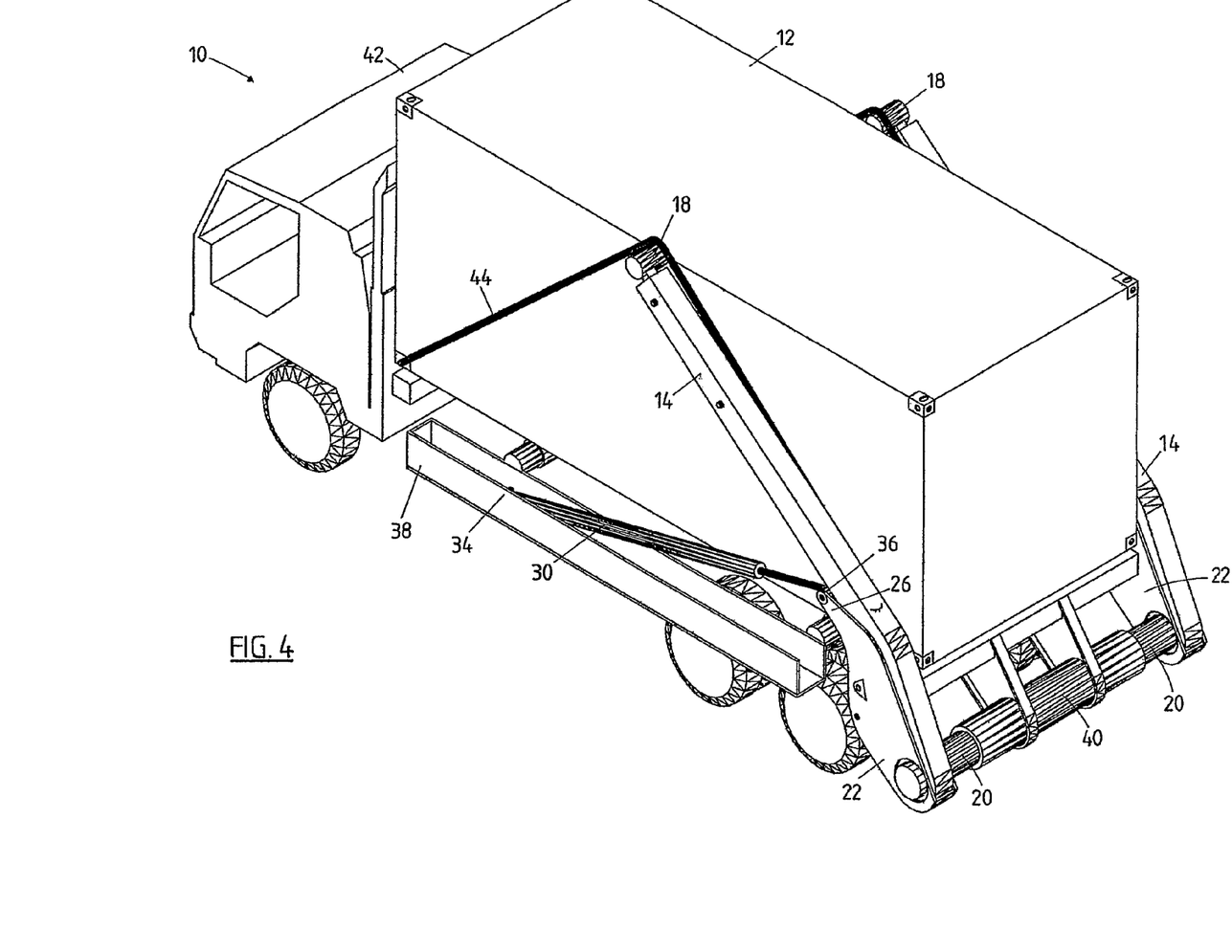
FIG. 4 is a rear, upper view of the truck of FIG. 1, shown with the container loading apparatus in an engaged position.
Figure 5:
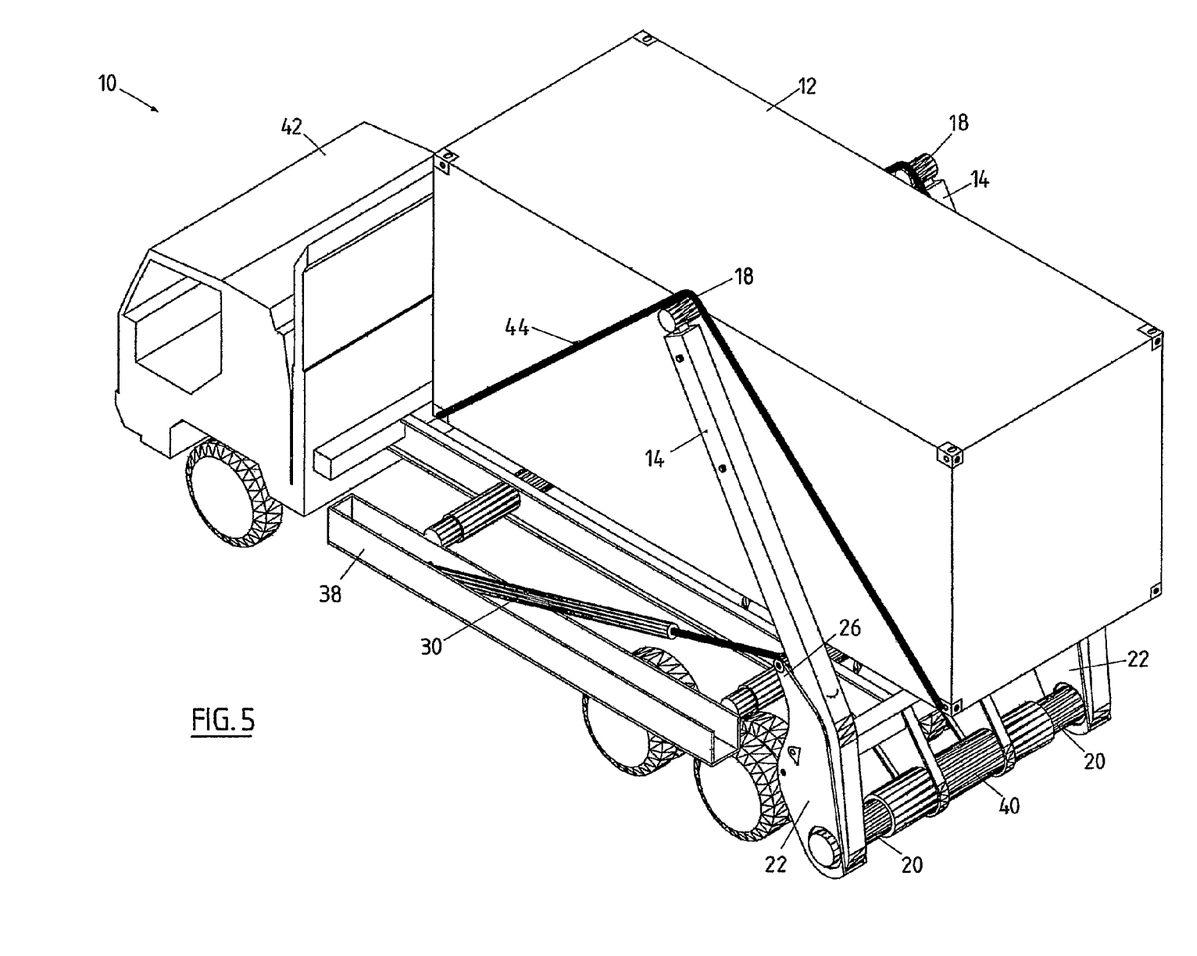
FIG. 5 is a rear, upper view of the truck of FIG. 1, shown with the container loading apparatus in a first intermediate position during unloading.

FIG. 4 shows the container loading apparatus in an engaged position, where the first arms 14 have traveled to the point where their first ends 18 are located midway along the container 12. This travel has been effected by further extension of the first rams 30. In this position the container loading apparatus has engaged the container 12. In the embodiment of the drawings this has been done by the use of straps 44 mounted to the first ends 18 of the first arms 14, and attached to the container 12 at lower corners thereof. It will be appreciated that other methods of engagement may be employed. It will also be appreciated that the location of the first ends 18 midway along the container allow the container to by supported without substantial tilting.

FIGS. 5 to 11 show the actual unloading sequence of an engaged container.

Figure 6:
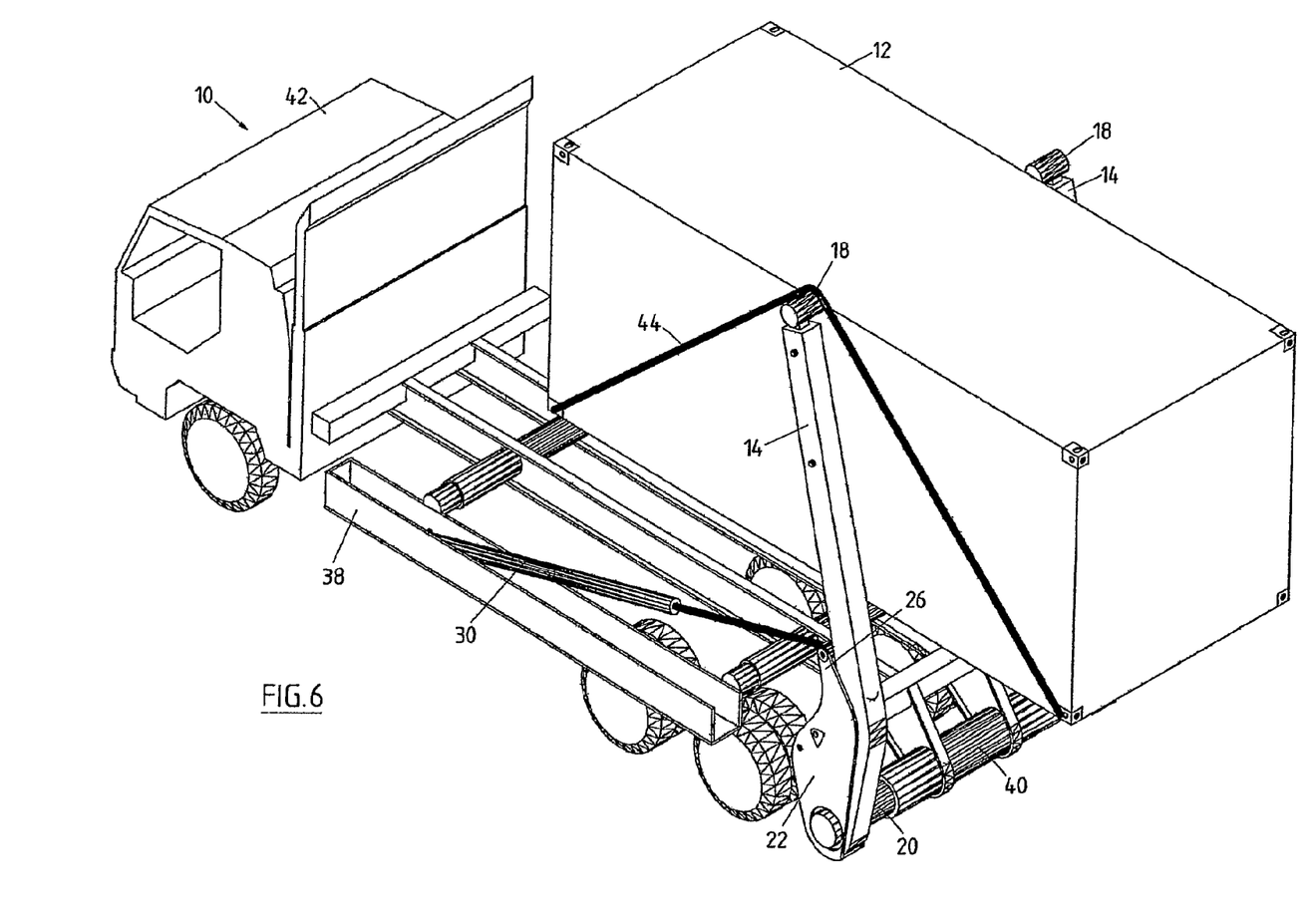
FIG. 6 is a rear, upper view of the truck of FIG. 1, shown with the container loading apparatus in a second intermediate position during unloading.

To commence unloading, the first rams 30 extend still further until the first and second arms 14, 22 are nearly vertical. In the example of FIG. 6, the first and second arms are within 5° of vertical. The container 12 thus travels in an arc about the axle 20.

Figure 7:
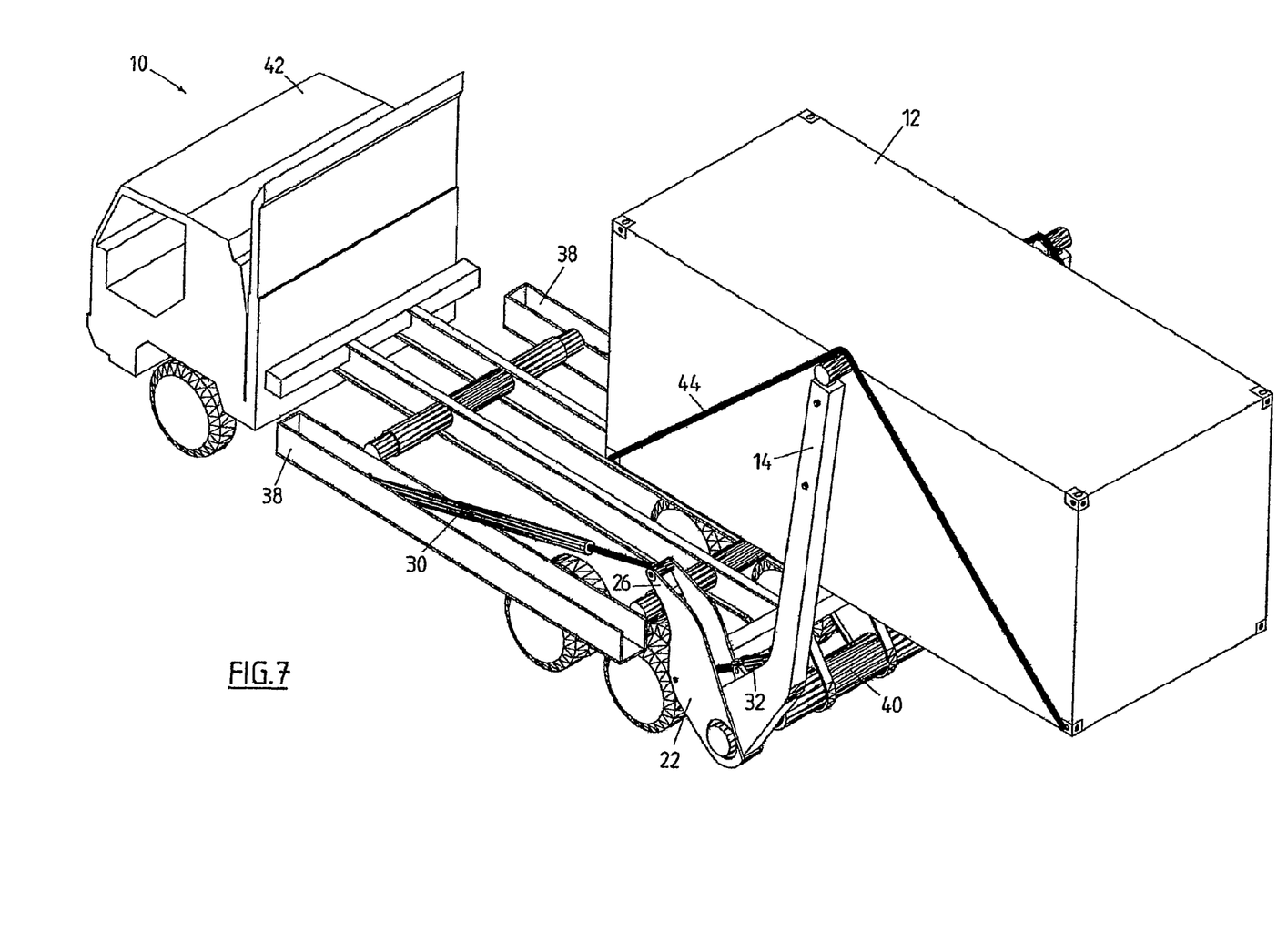
FIG. 7 is a rear, upper view of the truck of FIG. 1, shown with the container loading apparatus in a third intermediate position during unloading.
Figure 8:
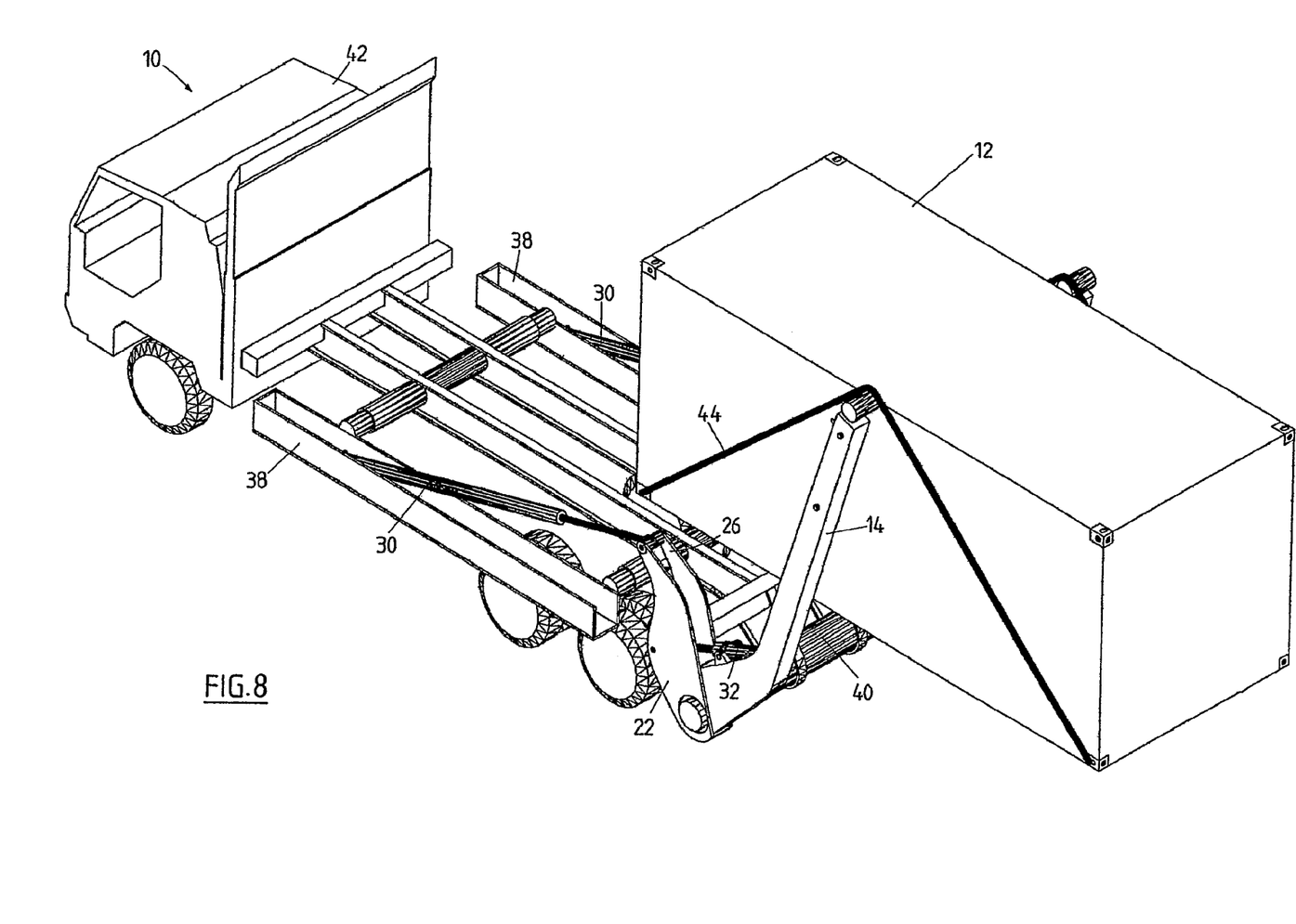
FIG. 8 is a rear, upper view of the truck of FIG. 1, shown with the container loading apparatus in a fourth intermediate position during unloading.
Figure 9:
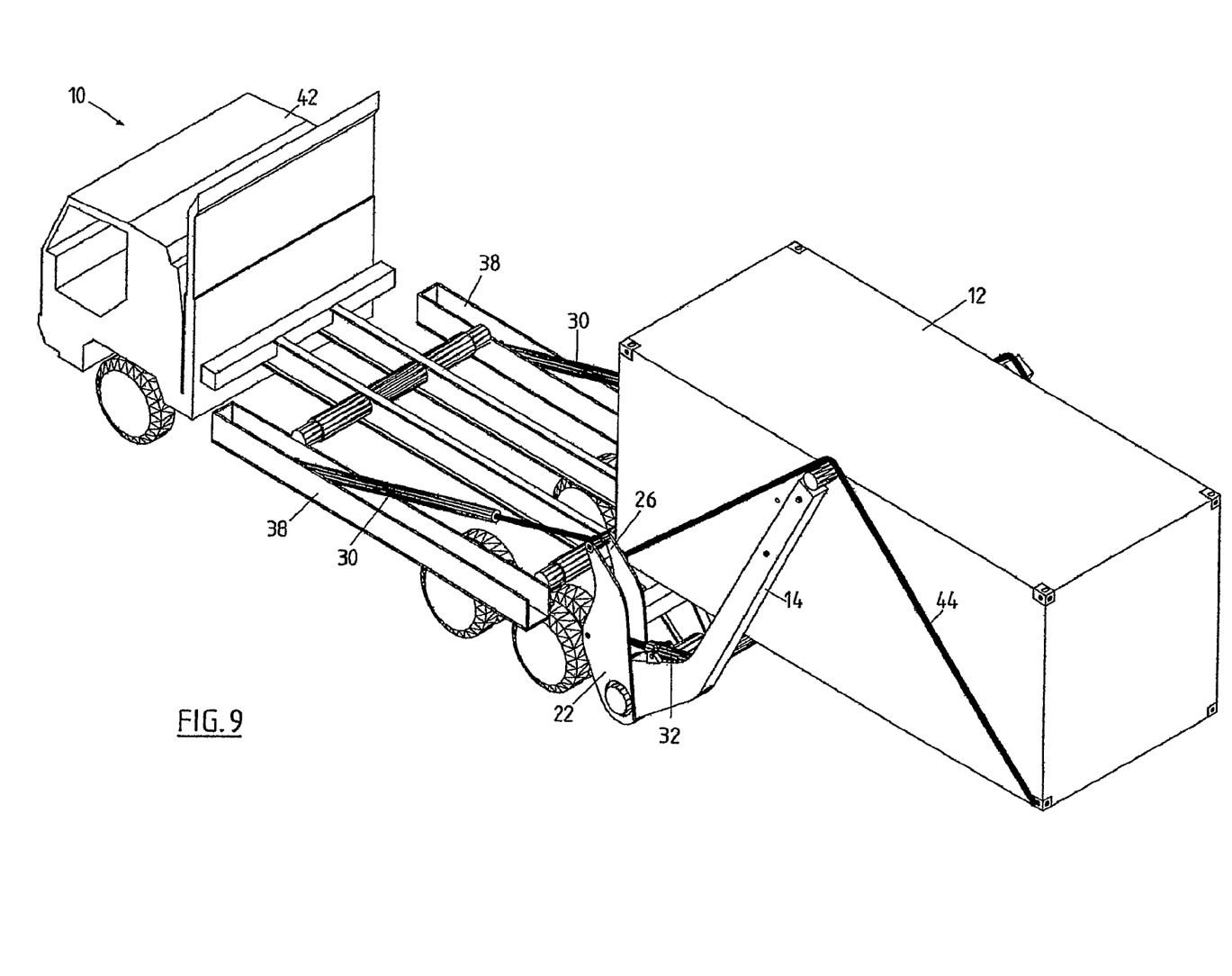
FIG. 9 is a rear, upper view of the truck of FIG. 1, shown with the container loading apparatus in a fifth intermediate position during unloading.

From this position, the first rams 30 contract whilst the second rams 32 extend. This is shown in FIG. 7. During this operation the first arms 14 and hence the container 12 stay substantially in the same position, whilst the second arms 22 rotate about the axle 20 inwardly towards the arm receiving channels 35. During this operation the position of the first arms 14 may vary within a range of about 5° either side of vertical, whilst the second arms 22 rotate to a position offset about 50° from the first arms 14. The maintenance of the container 12 in a close to vertical position means that the weight of the container, acting downwards through the first arms 14, does not cause a significant moment about the axle 20.

It will be appreciated that at the end of the operation, shown in FIG. 7, the first rams 30 will be substantially withdrawn whilst the second rams 32 will be substantially extended.

Unloading of the container then continues by expansion of the first rams 30 whilst maintaining the second rams 32 in their extended state. Expansion of the first rams 30 cause forward rotation of the second arms 22, which in turn cause rotation of the first arms 14. The 50° offset is maintained between the first and second arms 14, 22.

Figure 11:
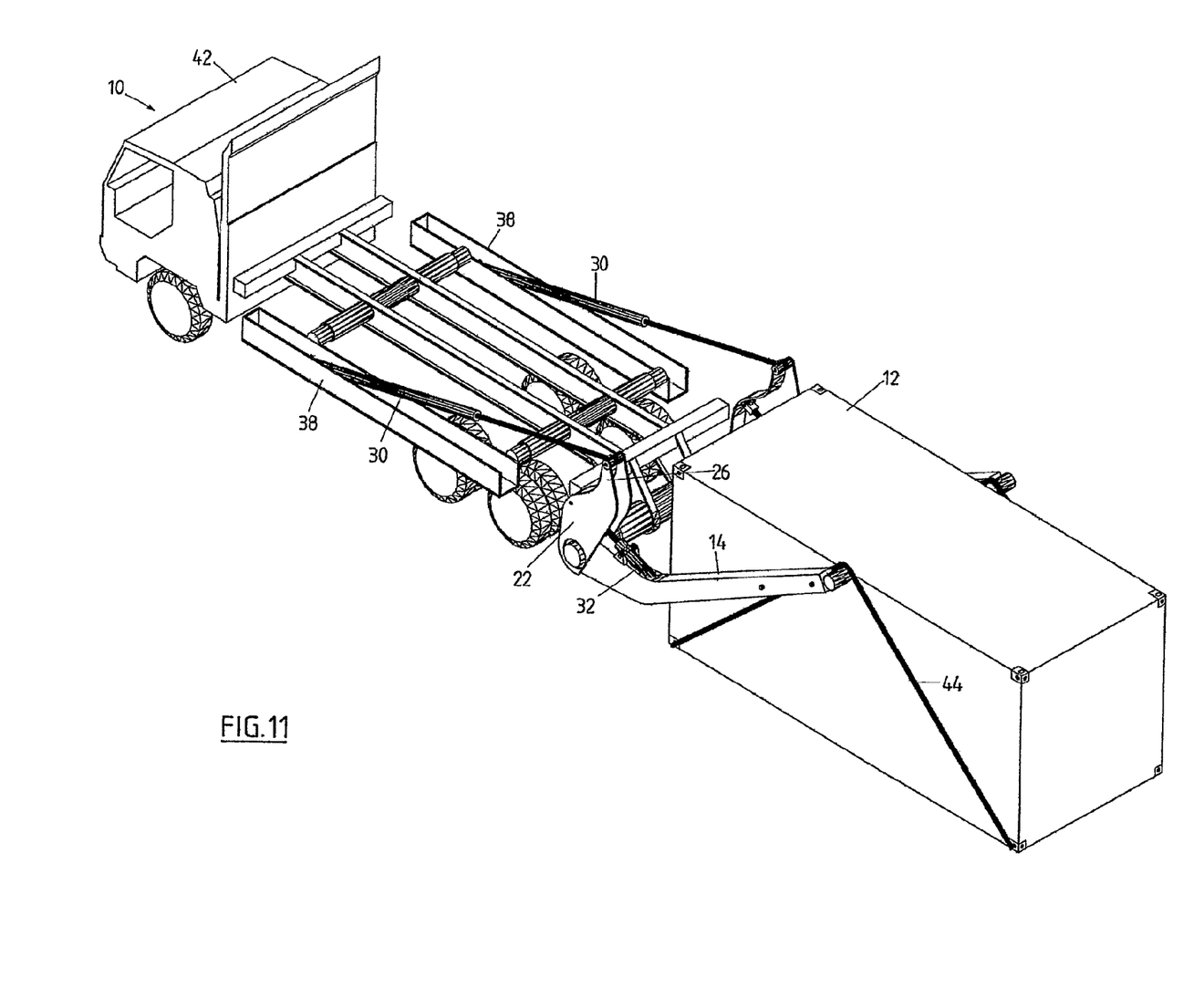
FIG. 11 is a rear, upper view of the truck of FIG. 1, shown with the container loading apparatus in an unloaded position.

FIG. 11 shows the container in its final, unloaded position on the ground behind the truck 10. In the embodiment of the drawings the first rams 30 have extended the second arms 22 beyond the vertical, to an angle of about 108° relative to the arm receiving channels 35. The first arms 14 are thus at an angle of about 158° relative to the arm receiving channels 38.

Figure 12:
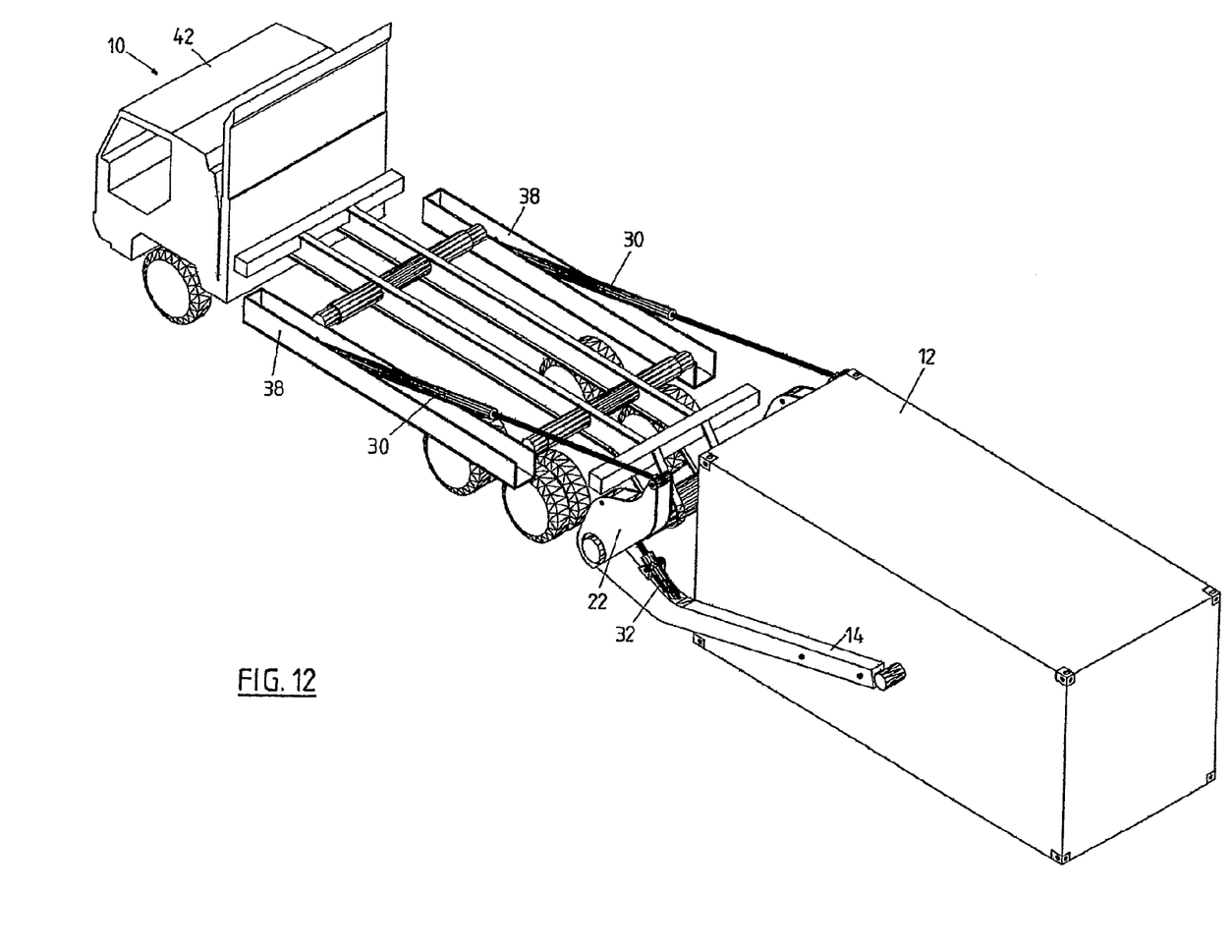
FIG. 12 is a rear, upper view of the truck of FIG. 1, shown with the container loading apparatus in a disengaged position following unloading.

The container 12 may then be disengaged from the container loading apparatus by further extension of the first rams 30, resulting in rotation of the first and second arms 14, 22. This is shown in FIG. 12 with each first arm 13 rotated close to 180° relative to its respective arm receiving channel 38.

In order to load a container from the ground the above steps are reversed.

Figure 10:
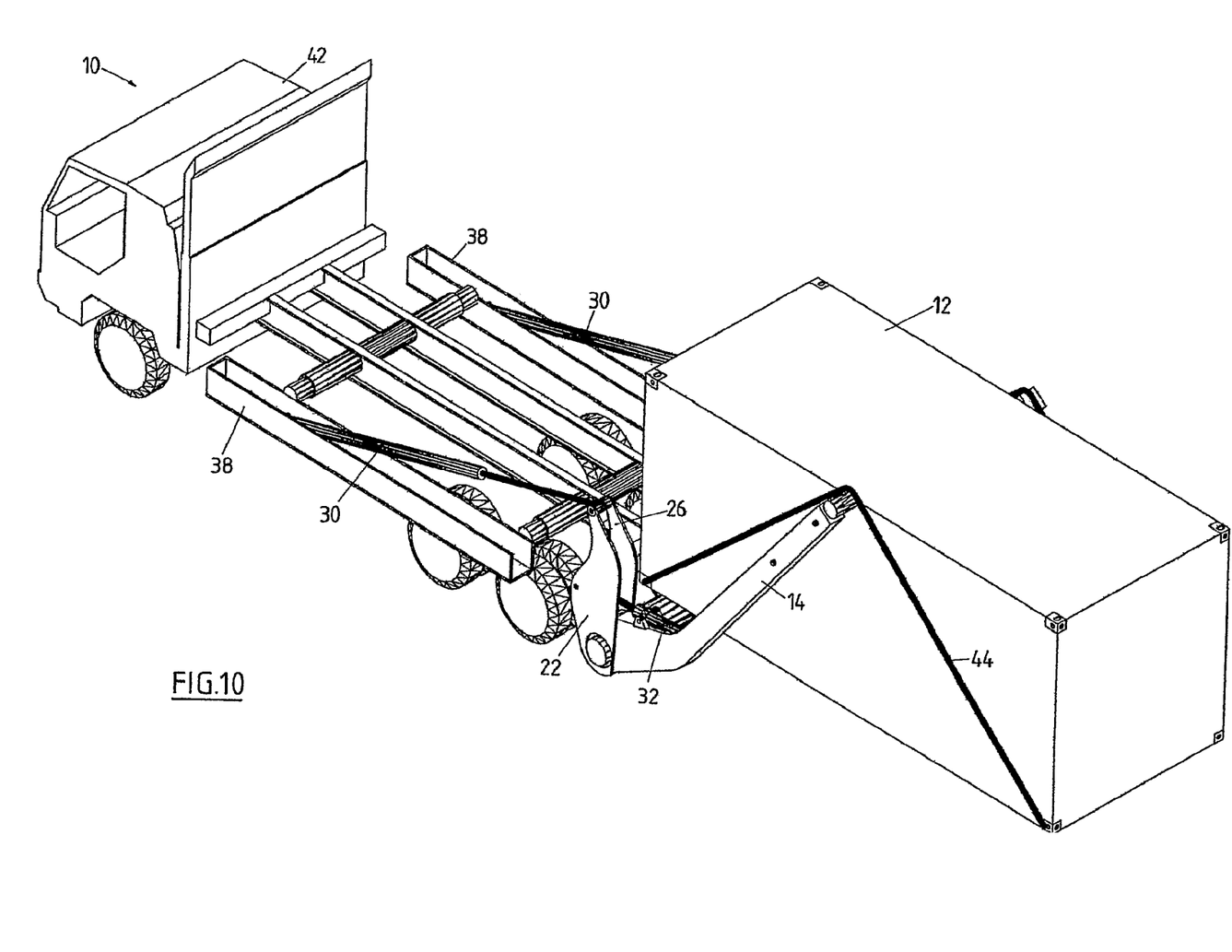
FIG. 10 is a rear, upper view of the truck of FIG. 1, shown with the container loading apparatus in a sixth intermediate position during unloading.

It will be appreciated that the moment applied by the actuation of the first ram 30 is maximised when the ram 30 acts along a line furthest away from passing through the axle 20. In the present case, this is apparent in the unloaded position as shown in FIG. 10. The dual ram arrangement of the present invention is thus far more efficient in moving a container, particularly in lifting the container from the ground, than a single ram arrangement.

Modifications and variations as would be apparent to a skilled addressee are deemed to be within the scope of the present invention.

The invention claimed is:

1. A container loading apparatus comprising a container attachment means and a secondary support means, in which the container attachment means and the secondary support means are each independently rotatable about respective substantially horizontal axes from a stowed position in which the container attachment means and the secondary support means are disposed substantially beneath a loaded container, the container loading apparatus further comprising a first actuation means and a second actuation means, wherein the first actuation means, in use, causes the secondary support means to rotate about its horizontal axis and the second actuation means, in use, causes the container attachment means to rotate relative to the secondary support means, wherein the container loading apparatus is moveable between an inner stowed position and an outer stowed position, the container attachment means being directly beneath a loaded container in the inner stowed position and being outside the container is the outer stowed position.

2. A container loading apparatus as claimed in claim 1, wherein the container attachment means and the secondary support means are each rotatable about the same substantially horizontal axis.

3. A container loading apparatus as claimed in claim 2, wherein the axis of rotation is located to the rear of the container when the container is loaded.

4. A container loading apparatus as claimed in claim 2, wherein the secondary support means is located about the container attachment means when in the stowed position.

5. A container loading apparatus as claimed in claim 1, wherein the first actuation means is a first hydraulic ram.

6. A container loading apparatus as claimed in claim 5, wherein the second actuation means is a second hydraulic ram.

7. A container loading apparatus as claimed in claim 5, wherein the first hydraulic ram has a line of action about the substantially horizontal axis of the container attachment means.

8. A container loading apparatus as claimed in claim 1, wherein the container attachment means is arranged to rotate through 180°.

9. A container loading apparatus as claimed in claim 1, wherein the secondary support means is arranged to rotate up to 50° away from the container attachment means.

10. A container loading apparatus as claimed in claim 1, wherein the container attachment means and the secondary support means are within an arm receiving channel when in the stowed position.

11. A container loading apparatus as claimed in claim 10, wherein the first actuation means acts between the arm receiving channel and the secondary support means.

12. A container loading apparatus as claimed in claim 1, wherein an axle about which the container attachment means rotates is axially extendible between the inner stowed position and the outer stowed position.

13. A method of unloading a container from a truck using the container loading apparatus of claim 1, the method comprising the steps of:
 (a) moving the container loading apparatus from the stowed position to a travelling position wherein the container attachment means is able to rotate about its horizontal axis;
 (b) operating the first actuation means to move the container attachment means into an engaged position whereby a first end of the container attachment means is located about midway along the container;
 (c) engaging the container with the container attachment means;
 (d) operating the first actuation means to move the container into a position substantially above the horizontal axis;
 (e) operating the second actuation means to move the secondary support means away from the container attachment means whilst operating the first actuation means to maintain the container substantially above the horizontal axis; and
 (f) operating the first actuation means to lower the container to the ground to the rear of the truck.

\* \* \* \* \*